United States Patent Office 2,779,715
Patented Jan. 29, 1957

2,779,715

PROCESS FOR REMOVING ARSENIC FROM A HYDROCARBON FEED OIL USED IN A REFORMING PROCESS EMPLOYING A NOBLE METAL AS A CATALYST

Maurice J. Murray, Naperville, and Howard A. Plagge, North Riverside, Ill., assignors to Universal Oil Products Company, Chicago, Ill., a corporation of Delaware No Drawing. Application June 14, 1952,
Serial No. 293,653

15 Claims. (Cl. 196—50)

This invention relates to a catalytic conversion process and more particularly to a conversion process effected in the presence of a catalyst comprising alumina and a noble metal.

Recent developments in the field of reforming of gasoline in order to improve the antiknock characteristics of the gasoline and to the production of aromatic hydrocarbons are directed to the use of a catalyst comprising alumina and platinum. For the hydrocarbon conversion reactions it appears that alumina offers particular advantages in combination with a noble metal and particularly platinum. The association of alumina and platinum catalyzes the reactions desired in reforming operations to a greater extent than heretofore obtainable, with a minimum of undesired side reactions. The reactions desired in reforming operations include dehydrogenation of naphthenes to aromatics, dehydrocyclization of paraffins to aromatics, isomerization of alkylnaphthenes containing 5 carbon rings to naphthenes containing 6 carbon rings and dehydrogenation to aromatics, isomerization of straight chain or slightly branched chain paraffins to more highly branched chain paraffins, controlled cracking or splitting of carbon to carbon bonds, desulfurization, etc. In the dehydrogenation operations to produce aromatics, the desired reactions include the dehydrogenation, dehydrocyclization and naphthene isomerization reactions set forth above.

As hereinbefore set forth, the combination of alumina and a noble metal and particularly platinum is especially active for effecting the desired reactions with a minimum of undesired side reactions. This catalyst appears peculiarly effective in the treatment of charge stocks comprising hydrocarbons and thus offers particular advantages for use in the conversion of hydrocarbons.

In the conversion of hydrocarbons, it now has been found that certain hydrocarbon charging stocks contain certain impurities which rapidly deactivate the alumina platinum catalyst and render the same inactive for catalyzing the desired reactions as hereinbefore set forth. These impurities are present in hydrocarbon charge stocks in very minute quantities and, therefore, would not be expected to exert any substantial deactivating effect on the catalyst. Surprisingly, certain of these impurities, even in the very minute concentrations as are present in the hydrocarbon charge stocks, do rapidly deactivate the alumina-platinum catalyst and, therefore, render the process inoperable for the intended purpose. In accordance with the present invention, the charge stock is treated in order to remove the harmful impurities or to reduce the content thereof to a concentration at which the deleterious effects are substantially minimized.

In one embodiment the present invention relates to a conversion process effected in the presence of a catalyst comprising alumina and a noble metal, which comprises treating an impurity-containing charge with at least one alkaline material selected from the group consisting of the hydroxides, the oxides and salts, which, when dissolved in water, have a pH of above about 7, of an alkali metal and an alkaline earth metal, separating therefrom a charge fraction having an impurity content of less than about 0.05 parts per million and less than that of said charge, and subjecting said charge fraction to conversion in the presence of a catalyst comprising alumina and a noble metal.

In another embodiment the present invention relates to a hydrocarbon conversion process which comprises treating an arsenic-containing hydrocarbon charge with an aqueous caustic solution, separating therefrom a charge fraction having an arsenic content of less than about 0.05 parts per million and less than that of said charge, and subjecting said hydrocarbon fraction to conversion in the presence of a catalyst comprising alumina and platinum.

In a specific embodiment the present invention relates to a process for producing a reformed gasoline from an arsenic-containing hydrocarbon charge, which comprises treating the charge with an aqueous solution of an alkali metal hydroxide, separating therefrom a gasoline fraction having an arsenic content of less than about 0.015 parts per million and less than that of said charge, and reforming said gasoline fraction in the presence of a catalyst comprising alumina, platinum and combined halogen.

As will be noted from the embodiments, an arsenic-containing hydrocarbon charge is treated to lower the arsenic content to less than about 0.05 parts per million. Preferably the arsenic content is reduced to below about 0.015 parts per million. As hereinbefore set forth and as will be shown in the following examples, the presence of arsenic in concentrations of greater than even the minute quantities of 0.05 parts per million rapidly deactivates the alumina-platinum catalyst. While it is believed that arsenic is the most harmful impurity, other undesirable impurities having a deleterious effect on the catalyst include molybdenum, antimony, nickel, cadmium and lead. It is understood that these impurities may be present as the element or probably as one or more compounds thereof, and that reference to the element in the present specifications and claims is intended to include the free element and/or compounds thereof. This method of referring to the element is justified because it appears that the element is the harmful component and that, when present as a specific compound, the compound may decompose and other compounds of the element may be formed during the conversion reaction. For example, it is believed that arsenic deactivates the catalyst by forming a platinum arsenide or other compound of platinum and arsenic. Although arsenic is considered as a non-metal by some authorities, it resembles the metals in a number of respects and, in view of the fact that the other impurities hereinbefore set forth are metals, it is understood that reference to metal impurities or similar phraseology is intended to include arsenic along with the other impurities as set forth above, and that removal of these metallic impurities below 0.05 parts per million means that the treated charge does not contain any one of these impurities in a concentration above 0.05 parts per million, although the sum total of the impurities may be above 0.05 parts per million.

As hereinbefore set forth, the novel features of the present invention are directed to catalysts comprising alumina and a noble metal. Platinum is a preferred noble metal for use in accordance with the present invention. Other noble metals include palladium, silver, gold, ruthenium, rhodium, osmium, iridium, etc., with the understanding that these catalysts are not necessarily equivalent. The platinum preferably is utilized in the catalyst in a concentration of from about 0.01% to about 1% by weight of the final catalyst, although it is understood that lower or higher concentrations of platinum, which generally will not be above about 10%, may be employed.

As hereinbefore set forth, the catalyst contains alumina. In one embodiment the alumina comprises a major proportion of the catalyst and may comprise, for example, over 95% by weight of the catalyst. In another embodiment, the catalyst may include alumina as well as other inorganic oxides as, for example, oxides of silicon, magnesium, zirconium, thorium, vanadium, titanium, boron, etc., or mixtures thereof, and the alumina, moreover, may comprise a minor proportion of the catalyst. For example, one catalyst may comprise silica-alumina-platinum and in one embodiment the silica may comprise from about 70% to about 95% and the alumina may comprise from about 5% to about 30% by weight of the mixture.

It is understood that the alumina and other inorganic oxides are porous, and reference to alumina in the present specifications and claims is intended to refer to porous alumina, including gamma-alumina, and not to include non-porous aluminas as a component of the catalyst in a substantial amount.

In a preferred embodiment the alumina-platinum catalyst also contains a halogen. The halogen may be in a concentration of from about 0.01% to about 8% by weight of the final catalyst, although higher or lower concentrations may be employed. The halogen is believed to be present in combined form, and the halogen preferably comprises combined fluorine which advantageously is present in a concentration of from about 0.01% to about 3% by weight of the catalyst. The combined chlorine generally is present in a concentration of from about 0.1% to about 8% by weight of the catalyst. The combined bromine and combined iodine generally are not as preferable but may be employed, when desired, in a concentration of from about 0.01% to about 8% by weight of the catalyst. It is understood that the various halogens which may be employed are not necessarily equivalent and also that the combined halogen content of the catalyst may comprise a mixture of two or more of the halogens, in which case the total halogen concentration preferably comprises from about 0.01% to about 8% by weight of the catalyst.

As hereinbefore set forth, charge stocks containing arsenic are treated with a particular alkaline material to separate a charge fraction having an arsenic content of below about 0.05 parts per million and preferably below about 0.015 parts per million. The alkaline material is selected from the hydroxides, oxides and particular salts of the alkali metals and the alkaline earth metals. In a preferred embodiment, the alkaline material is utilized as a water solution thereof and, in this embodiment, the alkaline material should be water soluble. The aqueous solution, after serving to remove arsenic from the hydrocarbon charge, may be readily separated from the hydrocarbons in order to recover a treated hydrocarbon fraction substantially reduced in arsenic content.

In one embodiment the treating agent of the present invention comprises a hydroxide of the alkali metals including sodium hydroxide, lithium hydroxide, potassium hydroxide, rubidium hydroxide and cesium hydroxide, or of the alkaline earth metals including calcium hydroxide, strontium hydroxide and barium hydroxide. Preferred hydroxides for use in the present invention comprise the hydroxides of sodium and potassium. It is understood that the sodium hydroxide or potassium hydroxide solutions which previously have been used to treat hydrocarbons may be utilized without regeneration in accordance with the present invention but not necessarily with equivalent results.

In another embodiment, the treating agent may comprise an oxide of the alkali metals or alkaline earth metals. In many cases, the oxide when utilized in a water solution will form the corresponding hydroxides as, for example, sodium oxide forms sodium hydroxide, potassium oxide forms potassium hydroxide, etc. It is understood that the oxide and/or hydroxide may be used in accordance with the present invention.

In still another embodiment the treating agent of the present invention comprises a salt of the alkali metal or alkaline earth metals which salt, when dissolved in water, will have a pH of above 7. As representative of suitable salts for use in accordance with this invention, the salts of sodium are herein specifically set forth, with the understanding that similar salts of the other alkali metals and the alkaline earth metals having the properties set forth above may be utilized. Representative salts of sodium include sodium acetate, sodium phosphate, sodium borate, sodium carbonate, sodium citrate, sodium cyanide, sodium chromate, sodium formate, sodium lactate, sodium oxalate, sodium perborate, sodium potassium tartrate, sodium tartrate, etc. It is understood that the specific salts mentioned here are intended merely as representative of suitable salts to be used and that they intend to include both the organic and inorganic salts which, when dissolved in water, have a pH of above 7. These salts are preferably water soluble and are not hydrocarbon soluble so that they readily may be separated from the hydrocarbon distillate after the desired treatment. Therefore, the organic salts should not contain too many carbon atoms per molecule and preferably do not contain more than about 6 carbon atoms per molecule.

As hereinbefore set forth, in a preferred method the alkali metal or alkaline earth metal compounds is utilized as an aqueous solution. It is understood that the aqueous solution may be a dilute solution or a concentrated solution, the particular solution to be employed depending upon the type and amount of arsenic compounds present in the hydrocarbon distillate being treated. Thus, for example, caustic solutions containing from about 2% to about 50% sodium hydroxide may be employed. While the aqueous solutions are generally preferred, it is understood that other solutions which are not hydrocarbon soluble may be employed including solutions in alcohols, ketones, ethers, etc., preferably a mixture of the latter with water. For the same reason, the organic solvent should not contain a large number of carbon atoms per molecule because the solvent will be more soluble in the hydrocarbon than the water when utilized. Methanol, ethanol and propanol, acetone and methylethyl ketone, ketone solvents, dimethyl ether, methylethyl ether and diethyl ether are the preferred organic solvents and, when utilized, are preferably employed in combination with water.

In another embodiment the alkali metal or alkaline earth metal compound may be utilized as a solid bed and the hydrocarbons to be treated may be passed therethrough. In this embodiment, a solvent will not be employed. In another embodiment, the alkaline compound may be supported on a suitable carrying material. Satisfactory carrying materials include silica, alumina, aluminum silicates, kieselguhr, magnesia, zirconia, etc. The alkaline compound generally will comprise from about 5% to about 60% by weight of the carrying material.

The treatment of the hydrocarbon distillate may be effected at any suitable temperature which may range from atmospheric or below up to 500° F. or more. In most cases, satisfactory treatment is obtained at ambient temperature. In other cases, elevated temperature from about 100° to 500° F. or more under sufficient pressure to maintain the hydrocarbons and treated solution in substantially liquid phase may be employed. When the treating agent is utilized as a solid bed, the treatment may be effected with the hydrocarbons in vapor phase but the temperature in this treatment should not be above that at which substantial cracking of the hydrocarbons will occur. In general the temperature at which cracking occurs is above about 800° F. and, therefore, the temperature to be employed in this treatment should be below about 800° F.

Treatment in accordance with the present invention may be effected in any suitable manner which may be batch or continuous types of operation. In a batch type of operation, the hydrocarbon charge stock and alkaline compound are intimately mixed in a suitable zone. When the alkaline compound is used as an aqueous solution, the mixing is discontinued and the mixture is allowed to settle into a hydrocarbon phase and a solution phase containing the arsenic compounds. Each phase is then separately withdrawn. When the alkaline compound is utilized as a solid treating agent, the hydrocarbons may be separated from the treating agent by decantation, filtering or in any other suitable manner.

In a continuous type of operation, when utilizing the treating agent as a solution, the hydrocarbon charge and treating agent are passed either concurrently or countercurrently into a suitable zone which may contain suitable mixing devices, packing material such as Raschig rings, etc., and/or fractionating means such as bubble decks, side to side pans, etc. An upper treated hydrocarbon layer is separately withdrawn from the lower layer containing the alkaline compound and arsenic. The withdrawal may be continuous or intermittent.

When the alkaline compound is utilized as a solid material, it may be disposed in one or more zones and the hydrocarbon charge stock may be passed therethrough in either upward or downward flow. When the treatment is to be effected at elevated temperature, the charge stock may be heated to the desired temperature and/or the treating zone or zones may be heated in any suitable manner to obtain or maintain the desired temperature. Other methods of treatment may include the slurry type system in which the treating agent is carried through the reaction zone as a slurry in the charge stock, the moving bed type process in which the treating agent passes either concurrently or countercurrently to the charge stock, the fluidized type operation in which the charge and treating agent are maintained in a state of turbulence in the reaction zone, etc.

It is understood that two or more treating zones may be employed and that these zones may contain the same or different alkaline compounds of the type hereinbefore set forth. In some cases, it may be advisable to subject the treated distillate to fractionation or other methods in order to segregate a treated fraction further reduced in arsenic. With certain hydrocarbon distillates, the original treatment may convert the arsenic into a different form and the new arsenic compounds, when more volatile, may be removed as an overhead fraction by distillation or, when high boiling, may be retained in the bottoms of the distillation. In other cases, the treatment may be followed by water washing in order to further remove the small amount of arsenic compounds which may have been transformed by the prior treatment and/or not removed thereby.

As hereinbefore set forth, the novel features of the present invention are particularly applicable to the treatment of a gasoline fraction to be subjected to reforming. It is understood that the gasoline fraction may comprise a full boiling range gasoline having an end boiling point of from about 400° to about 430° F., or any selected fraction thereof and that it may include components boiling above the gasoline range, thus having an end boiling point up to 500° F. or more. The hydrocarbon fraction preferably comprises a substantially saturated hydrocarbon distillate, including straight run gasoline, natural gasoline, etc., or mixtures thereof. In some cases it may comprise an unsaturated distillate, including cracked gasoline, as well as mixtures of the unsaturated gasoline and saturated gasoline. The reforming operation is effected at a temperature of from about 600° to about 1000° F. or more, a pressure of from about atmospheric to 1000 pounds per square inch or more, and a weight hourly space velocity from about 0.1 to 10 or more. The weight hourly space velocity is defined as the weight of oil per hour per weight of catalyst in the reaction zone. In one embodiment, the reforming is effected in the presence of hydrogen and, in this embodiment, the hydrogen produced in the process preferably is recycled for further use therein. The concentration of hydrogen to hydrocarbon in the reaction zone generally will be in a molar ratio of from about 0.1:1 to about 10:1 or more. When the hydrogen gas to be recycled contains hydrogen sulfide or other impurities, it is within the scope of the invention to treat the recycle gas to remove the impurities before reusing the gas in the process.

In another preferred embodiment, the novel features of the present invention are particularly applicable to the conversion of naphthenes into aromatics as hereinbefore set forth. Generally the charge in this embodiment will comprise a selected hydrocarbon distillate which, in one embodiment, may have a boiling range of from about 140° to about 280° F. The conditions of operation used in this embodiment are substantially the same as those hereinbefore set forth except that the temperature to be employed preferably is within the range of from about 800° to 1000° F. or more.

While the process of the present invention is particularly applicable to the reforming or aromatization reactions hereinbefore set forth, it is understood that the novel features may be employed in any process in which a catalyst comprising alumina and a noble metal and particularly platinum is used. Representative processes include dehydrogenation of normally gaseous aliphatic hydrocarbons, such as ethane, propane and butane to the corresponding olefins, dehydrogenation of mono-olefins to di-olefins, destructive hydrogenation or hydrocracking reactions in which a hydrocarbon and particularly oil heavier than gasoline is subjected to conversion to produce lower boiling products and particularly gasoline, non-destructive hydrogenation reactions, including hydrogenation of unsaturated aliphatic compounds, such as mono-olefins, di-olefins, etc., to form the corresponding saturated hydrocarbons, hydrogenation of unsaturated cyclic hydrocarbons, hydrogenation of unsaturated alcohols, ketones, acids, etc., oxidation of olefins to form the corresponding oxides, such as the oxidation of ethylene to ethylene oxide, propylene to propylene oxide, etc., oxidation of alcohols, ketones, etc. The conditions of operation to be employed will depend upon the particular reaction to be effected. Thus, for non-destructive hydrogenation reactions, the temperature may range from atmospheric to 500° F. or more, the pressure from about 10 to about 2000 pounds or more, and the weight hourly space velocity of from about 0.1 to 10 or more.

The conversion reactions mentioned above may be effected in any suitable manner. The reforming process thus may be effected in the fixed bed, slurry type, moving bed or fluidized type process heretofore described.

The following examples are introduced to illustrate further the novelty and utility of the present invention but not with the intention of unduly limiting the same.

*Example I*

To a catalyst comprising alumina, about 0.3% by weight of platinum and about 0.2% by weight of combined fluorine, arsenic was added in a concentration of 0.0025 gram atoms per 50 grams of catalyst. The arsenic was added as arsenic pentoxide in ammoniacal solution by dissolving the required amount in 50 ml. of water and pouring over 50 grams of the catalyst. The catalyst was allowed to stand for one-half hour, then was dried on a water bath and finally calcined for 3 hours in a muffle furnace at 932° F.

The catalysts in this example were utilized for the aromatization of a Mid-Continent naphtha having an A. P. I. gravity at 60° F. of 52.7, an aromatic content of 8.8% and a boiling range of 229° to 387° F. The aromatization was effected at a temperature of 977° F., a superatmospheric pressure of 300 pounds per square inch and a hydrogen to hydrogen molar ratio of 1.75:1.

Catalyst A comprised the alumina-platinum-halogen composite as described above but not containing the arsenic. Catalyst B comprised the catalyst containing the arsenic as described above.

In the aromatization runs, Catalyst A produced an average of 48.% by weight of aromatics. In contrast, Catalyst B under the same conditions produced only 23.6% by weight of aromatics. It thus will be noted that the arsenic reduced the aromatization activity of the catalyst to less than half of the catalyst not containing arsenic.

*Example II*

Other catalysts were prepared in a similar manner as described in Example I but contained 0.0025 gram atoms of molybdenum, antimony, nickel, cadmium and lead. These catalysts when utilized under the same conditions as described in Example I produced the following yields of aromatics:

TABLE

| Added component: | Percent aromatics |
|---|---|
| None | 48.3 |
| Molybdenum | 24.5 |
| Antimony | 30.0 |
| Nickel | 30.2 |
| Cadmium | 30.7 |
| Lead | 33.5 |

Here again it will be noted that catalysts containing as low as 0.0025 gram atoms of the various impurities considerably reduced the aromatization activity of the catalysts.

*Example III*

In a commercial reforming process utilizing a catalyst as described in Example I and charging approximately 1200 barrels per day of a Mid-Continent naphtha, the activity of the catalyst decreased rapidly. The naphtha had an A. P. I. gravity of about 53.0, a boiling range of from 210° to 428° F. and contained approximately 6.8% by weight of aromatics. It was found that the naphtha being charged to this unit contained approximately 0.16 part per million of arsenic.

As hereinbefore set forth, one of the desired reactions in reforming operations is dehydrogenation of the naphthenes to aromatics. This dehydrogenation is highly endothermic and, therefore, results in a comparatively large temperature differential between the inlet and outlet of a reaction zone maintained under adiabatic conditions. This temperature differential is indicative of the dehydrogenation activity of the catalyst. In this process, the naphtha was introduced into the reaction zone at a temperature of approximately 900° F. and in normal operations a temperature drop of above about 50 degrees indicates that satisfactory dehydrogenation is obtained. However, because of the arsenic content of the naphtha, the temperature differential between the inlet and outlet of the reaction zone on the first day was 53° F. but after 11 days of operation it dropped to 17° F. It readily is apparent that this small temperature differential indicates substantial loss in the dehydrogenation activity of the catalyst.

As measured in octane number, the operation in which the temperature differential between the inlet and outlet of the reaction zone was above about 50° F. resulted in a reformate having an F-1+3 cc. of tetraethyl lead octane number of 92. In contrast, under the same conditions of operation but utilizing the catalyst deactivated by arsenic-containing impurities, in which the temperature differential between the inlet and outlet of the reaction zone was only 17° F., the F-1+3 cc. of tetraethyl lead octane number was only 72.4. The F-1+3 cc. of lead octane number of the charge fraction was 66.5. Thus it is seen that the temperature differential in the reaction zone is a measure of the activity of the catalyst.

*Example IV*

600 cc. of the naphtha described in Example III were intimately shaken with 25 ml. of an aqueous 5% sodium hydroxide solution at room temperature. After thorough mixing, the mixture was allowed to settle into a hydrocarbon phase and an aqueous caustic phase. The hydrocarbon layer was separated and again washed with 25 ml. of 5% sodium hydroxide solution. After thorough mixing, the hydrocarbon layer was separated from the aqueous caustic layer. The hydrocarbon was then washed three times with 100 cc. of water. This treatment served to reduce the arsenic content of the naphtha to 0.015 part per million.

*Example V*

A South American naphtha having an A. P. I. gravity of 57° and a boiling range of from about 180° to 335° F. contained 0.059 parts per million of arsenic. 250 ml. of this naphtha were treated with 20 ml. of 2 normal sodium hydroxide aqueous solution at room temperature. This treatment reduced the arsenic content of the naphtha to substantially zero.

*Example VI*

250 ml. of the naphtha described in Example V were treated with 20 ml. of a 1% sodium carbonate solution in water at room temperature. This treatment reduced the arsenic content of the naphtha to substantially zero.

*Example VII*

A straight run naphtha having an A. P. I. gravity of about 65°, a boiling range of from about 110° to about 370° F. and an arsenic content of 0.80 parts per million may be treated with a methanol solution containing 20% by weight of potassium hydroxide. This treatment will serve to reduce the arsenic content of the naphtha to below about 0.015 parts per million.

*Example VIII*

A treating reagent comprising 20% of calcium phosphate composited with kieselguhr is used as a fixed bed in a reaction zone. Three of such zones are employed and a naphtha containing arsenic is passed in series therethrough at an initial temperature of 150° F. and an initial pressure of 50 pounds per square inch. This treatment will serve to reduce the arsenic content of the naphtha to below about 0.015 parts per million.

We claim as our invention:

1. The method of converting an arsenic-containing hydrocarbon charge which comprises treating the charge with at least one alkaline material selected from the group consisting of the hydroxides, oxides and salts which, when dissolved in water, have a pH of above about 7, of an alkali metal and an alkaline earth metal, separating therefrom a charge fraction having an arsenic content of less than about 0.05 parts per million and less than that of said charge, and subjecting said charge fraction to conversion in the presence of a catalyst comprising alumina and a noble metal.

2. The process of producing reformed gasoline from an arsenic-containing hydrocarbon charge which comprises treating the charge with at least one alkaline material selected from the group consisting of the hydroxides, oxides and salts which, when dissolved in water, have a pH of above about 7, of an alkali metal and an alkaline earth metal, separating therefrom a gasoline fraction having an arsenic content of less than about 0.015 parts per million and less than that of said charge, and reforming said gasoline fraction in the presence of a catalyst comprising alumina and platinum.

3. The process of claim 2 further characterized in that said alkaline material comprises an alkali metal hydroxide.

4. The process of claim 3 further characterized in that said alkali metal hydroxide comprises sodium hydroxide.

5. The process of claim 3 further characterized in that said alkali metal hydroxide comprises an aqueous caustic solution.

6. The process of claim 3 further characterized in that said alkali metal hydroxide comprises potassium hydroxide.

7. The process of claim 2 further characterized in that said alkaline material comprises an alkaline earth metal hydroxide.

8. The process of claim 7 further characterized in that said alkaline earth metal hydroxide comprises calcium hydroxide.

9. The process of claim 2 further characterized in that said alkaline material comprises an alkali metal carbonate.

10. The process of claim 9 further characterized in that said alkali metal carbonate comprises sodium carbonate.

11. The process of claim 2 further characterized in that said alkaline material comprises a phosphate selected from a phosphate of an alkali metal and a phosphate of an alkaline earth metal.

12. The process of claim 11 further characterized in that said phosphate comprises sodium phosphate.

13. The process of producing reformed gasoline from an arsenic-containing hydrocarbon charge which comprises treating the charge with at least one alkaline material selected from the group consisting of the hydroxides, oxides and salts which, when dissolved in water, have a pH of above about 7, of an alkali metal and an alkaline earth metal, separating therefrom a charge fraction having an impurity content of less than about 0.05 parts per million and less than that of said charge, and subjecting said charge fraction to conversion in the presence of a catalyst comprising alumina and a noble metal.

14. The process of producing aromatics from an arsenic-containing hydrocarbon charge which comprises treating the charge with at least one alkaline material selected from the group consisting of the hydroxides, oxides and salts which, when dissolved in water, have a pH of above about 7, of an alkali metal and an alkaline earth metal, separating therefrom a charge fraction having an impurity content of less than about 0.05 parts per million and less than that of said charge, and subjecting said charge fraction to aromatization in the presence of a catalyst comprising alumina and a noble metal.

15. The process of producing aromatics from a naphthenic hydrocarbon charge containing arsenic which comprises treating the charge with an aqueous caustic solution, separating therefrom a naphthene fraction having an arsenic content of less than about 0.015 parts per million and less than that of said charge, and subjecting said fraction to dehydrogenation in the presence of a catalyst comprising alumina and platinum.

References Cited in the file of this patent

UNITED STATES PATENTS

| | | |
|---|---|---|
| 2,369,554 | Fischer | Feb. 13, 1945 |
| 2,479,110 | Haensel | Aug. 19, 1949 |
| 2,581,117 | Love | Jan. 1, 1952 |

OTHER REFERENCES

Lewis et al.: Ind. and Eng. Chem., anal. ed. vol. 9, pages 405–406 (1937).

Thomas: "The Science of Petroleum," vol. 11, Oxford University Press, page 1054 (1938).

Berkman: "Catalysis," Reinhold Pub. Co., 1940, pages 393, 395, 402.

Kalichevsky et al.: "Chemical Refining of Petroleum," 2nd edition, page 34 (1942), Reinhold Publishing Co., New York.

Maxted: "Journal of the Society of Chemical Industry," vol. 67, pages 93–97, March 1948.

"Chem. Abstracts," vol. 45, 3698g, May 10, 1951.